(12) United States Patent
Kikuchi et al.

(10) Patent No.: US 7,455,349 B2
(45) Date of Patent: Nov. 25, 2008

(54) TRUCK PLATFORM CONSTRUCTION

(75) Inventors: Manabu Kikuchi, Tokyo (JP); Michiaki Yamamoto, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 435 days.

(21) Appl. No.: 11/315,563

(22) Filed: Dec. 22, 2005

(65) Prior Publication Data

US 2006/0097548 A1    May 11, 2006

Related U.S. Application Data

(62) Division of application No. 10/881,958, filed on Jun. 29, 2004, now Pat. No. 7,152,910.

(30) Foreign Application Priority Data

Aug. 22, 2003  (JP)  ............................. 2003-208379

(51) Int. Cl.
  *B60D 1/00*  (2006.01)
(52) U.S. Cl. ............. 296/183.1; 296/181.3; 296/187.11

(58) Field of Classification Search .............. 296/183.1, 296/181.3, 187.11
See application file for complete search history.

(56) References Cited

U.S. PATENT DOCUMENTS 6,871,904 B2 * 3/2005 Bhat et al. ............... 296/183.1
7,152,910 B2 * 12/2006 Kikuchi et al. ........... 296/183.1

* cited by examiner

*Primary Examiner*—Stephen Gordon
(74) *Attorney, Agent, or Firm*—Duane Morris LLP (57) ABSTRACT

There is provided a truck platform construction in which when an external force acts on a platform from the rear side, a width change portion surely absorbs the energy thereof to prevent the deformation of a cab without marring the appearance of a top rail. A side panel erected at both side edges of a platform has an outer panel which constitutes a side external wall of the platform and is formed with an outer bent element at the upper edge thereof and an inner panel which constitutes a side internal wall of the platform. A top rail is formed by fixing the outer bent element onto the inner panel. At the rear part of the top rail, a width change portion in which the width of the top rail changes is formed, and the width of the width change portion increases gradually toward the rear of a truck.

4 Claims, 9 Drawing Sheets

TRUCK PLATFORM CONSTRUCTION

CROSS REFERENCES TO RELATED APPLICATIONS

This application is a Divisional application of application Ser. No. 10/881,958 filed Jun. 29, 2004 now U.S. Pat. No. 7,152,910 and Japanese Application No. 2003-208379 filed Aug. 22, 2003, the entire disclosure of which is hereby incorporated by reference.

BACKGROUND OF THE INVENTION

1. Field of the Invention

The present invention relates to a construction of a side panel erected at both side edges of a truck platform.

2. Description of the Related Art

A truck platform side wall construction has conventionally been known in which a side wall erected at both side edges of a truck platform includes an outer panel constituting a side external wall of the platform and an inner panel constituting a side internal wall thereof, and each of the panels has a top portion, a depending portion that depends downward from the top portion on the inside of the platform, and an external wall portion extending downward from a vehicle outside end portion of the top portion (for example, refer to Claim, Specification 3rd line to 18th line on page 9, FIG. 2, and FIG. 5 of Unexamined Japanese Utility Model Publication No. 63-110176). In this truck platform side wall construction, the top portion of inner panel is arranged under the top portion of outer panel, and the depending portion of outer panel and the depending portion of inner panel are lapped on each other in a state in which the depending portion of outer panel is positioned on the inside of platform, the lapped portions being spot welded. The top portion of inner panel is formed with a plurality of protrusions that project upward and are arranged in the longitudinal direction of platform, and these protrusions are brought into contact with the lower surface of outer panel top portion. A gap is formed between the top portions of both panels excluding the contact portions and between the external wall portions near the top portions, and a notch is formed in a portion adjacent to the protrusion in the depending portion of inner panel.

In the truck platform side wall construction configured as described above, when an external force acts on the platform from the rear side, stress is concentrated at the notch, and the side wall is deformed in this portion, by which the energy of the external force is absorbed. As a result, the platform is prevented from hitting a cab with a large force. Also, the deformation of cab can be prevented without a strong reinforcing member provided at the rear part of the cab, so that the manufacturing cost of cab can be reduced.

On the other hand, there has been disclosed a truck platform construction in which recesses are formed at predetermined intervals in the longitudinal direction of platform in inside projecting inclined surfaces of inner panels of the right and left side panels of platform; a rope hook of a U shape in plan view is fixed in the recess; and a stake insertion hole is formed in a top rail portion of side panel just above the rope hook (for example, refer to Claim, Specification 15th line on page 3 to 5th line on page 4, and FIG. 1 to 6 of Unexamined Japanese Utility Model Publication No. 3-43089).

In the truck platform construction configured as described above, the stake is inserted through the stake insertion hole formed in the top rail portion of side panel, and the lower end of stake is fitted in an inside space of rope hook in the recess, by which a stake deck can be formed. Also, by hooking a rope to the rope hook, a cargo can be fixed, which is the inherent object of the rope hook. Further, by placing a bridging material between the rope hooks in the recesses provided in the right and left side panels, cargoes can be stacked up in two tiers.

However, in the conventional truck platform side wall construction described in Unexamined Japanese Utility Model Publication No. 63-110176, the notch is formed only in the inner panel, and no notch is formed in the outer panel. Therefore, when an external force acts on the platform from the rear side, energy is not absorbed sufficiently in some cases.

Also, in the conventional truck platform side wall construction described in Unexamined Japanese Utility Model Publication No. 63-110176, when the inner panel is formed by a synthetic resin to improve the appearance of the inside of the platform, the lapped portion of the depending portion of outer panel and the depending portion of inner panel must be fixed to each other by using bolts and nuts in place of spot welding. In this case, since the shape of inner panel is intricate, the formability of inner panel is decreased, and also, as described above, when an external force acts on the platform from the rear side, energy is not absorbed sufficiently in some cases.

Further, in the conventional truck platform construction described in Unexamined Japanese Utility Model Publication No. 3-43089, the hole formed in the top rail portion of side panel is provided only to insert the stake for constructing the stake deck, and there is no technical concept that when an external force acts on the platform from the rear side, the energy thereof is absorbed. Since the hole is exposed in the top rail portion, there arises a problem in that the appearance of top rail portion is marred.

SUMMARY OF THE INVENTION

An object of the present invention is to provide a truck platform construction in which when an external force acts on a platform from the rear side, a width change-portion surely absorbs the energy thereof to prevent the deformation of a cab without marring the appearance of a top rail.

Another object of the present invention is to provide a truck platform construction in which when an inner panel or an outer panel is formed by a synthetic resin, the formability thereof is improved, and also when an external force acts on the platform from the rear side, energy thereof is absorbed surely by the width change portion to prevent the cab from being deformed.

The invention of a first aspect provides an improvement in a truck platform construction in which a side panel erected at both side edges of a platform on the back surface of a cab has an outer panel which constitutes a side external wall of the platform and is formed with an outer bent element at the upper edge thereof and an inner panel which constitutes a side internal wall of the platform, and a top rail is formed by fixing the outer bent element onto the inner panel.

The characteristic configuration of the invention of the first aspect is such that a width change portion in which the width of the top rail changes is formed at the rear part of the top rail, and the width of the width change portion increases gradually toward the rear of the truck.

In the truck platform construction described in the invention of the first aspect, when an external force acts on the platform from the rear side, stress is concentrated at the front part of the width change portion, so that the side panel is deformed in this portion. As a result, the energy of the aforementioned external force can surely be absorbed by the deformation of the platform, so that the external force transmitted to the cab decreases, by which the deformation of the cab can be prevented. Also, the width change portion is provided at the rear part of the truck and is distant from the cab, so that the deformation of the platform exerts no influence on the cab.

The invention of a second aspect is characterized in that in the invention of the first aspect, a terminal end of spread of the width change portion coincides with the side front end of a tail gate for closing an opening at the rear end of the platform.

In the truck platform construction described in the invention of the second aspect, since the terminal end of spread of the width change portion coincides with the side front end of a tail gate for closing an opening at the rear end of the platform, the appearance of the rear end corner portion of platform can be improved, and cargoes can easily be put in or taken out through the opening at the rear end of the platform. Further, since the platform width at the rear part of the platform increases, a large storage space can be secured.

The invention of a third aspect is characterized in that in the invention of the first aspect, a rear reinforcing member is provided on the rear end lower surface of the platform so as to extend in the vehicle width direction, and at least the front part of the width change portion is formed at a position at which it does not overlap with the rear reinforcing member in a plan view.

In the truck platform construction described in the invention of the third aspect, since at least the front part of the width change portion is positioned in front of the rear reinforcing member in plan view, the rigidity of the platform can be changed greatly at the front part of the width change portion.

The invention of a fourth aspect is characterized in that in the invention of the first aspect, a weak portion for change portion is formed in the width change portion.

In the truck platform construction described in the invention of the fourth aspect, since the weak portion for change portion is formed in the width change portion, stress is further concentrated at this portion.

The invention of a fifth aspect provides an improvement in a truck platform construction in which a side panel erected at both side edges of a platform on the back surface of a cab has an outer panel which constitutes a side external wall of the platform and an inner panel which constitutes a side internal wall of the platform; the outer panel has an outer bent element formed at the upper edge thereof and an outer through hole formed in the outer bent element; the inner panel has an inner through hole formed at the upper part thereof so that the hole center is aligned with that of the outer through hole; and a fastener is inserted through the outer through hole and the inner through hole to fix the inner panel to the outer panel, whereby a top rail is formed.

The characteristic configuration of the invention of the fifth aspect is such that either one or both of the inner panel and the outer panel are formed of a synthetic resin, and a weak portion for through hole is formed at the peripheral edge of either one or both of the inner through hole in the inner panel and the outer through hole in the outer panel.

In the truck platform construction described in the invention of the fifth aspect, when an external force acts on the platform from the rear side, stress is concentrated at the weak portion for through hole, and hence a crack is generated in this portion, so that the fastener comes off the inner panel, and the side panel becomes easy to deform. As a result, the energy of the aforementioned external force can surely be absorbed by the deformation of the platform, so that the external force transmitted to the cab decreases, by which the deformation of the cab can be prevented.

It is preferable that the weak portion for through hole be one kind or two or more kinds selected from a group consisting of a notch, a groove, a slit, and a notch formed at the peripheral edge of either one or both of the outer through hole and the inner through hole.

Also, the weak portion for through hole may consist of either one or both of an inner notch formed in the bent portion of the inner panel at the peripheral edge of the inner through hole and an outer notch formed in the bent portion of the outer panel at the peripheral edge of the outer through hole so as to be opposed to the inner notch.

The invention of an eighth aspect is characterized in that in the invention of the fifth aspect, a side rail having a channel shape in transverse cross section, which extends in the travel direction of a truck and the rear end of which is positioned in front of a width change portion, is attached on the upper inside surface of the side panel.

In the truck platform construction described in the invention of the eighth aspect, when an external force acts on the platform from the rear side, stress is concentrated between the width change portion and the rear end of side rail.

The invention of a ninth aspect provides an improvement in a truck platform construction in which a side panel erected at both side edges of a platform on the back surface of a cab has an outer panel which constitutes a side external wall of the platform and an inner panel which constitutes a side internal wall of the platform; the outer panel has an outer bent element formed at the upper edge thereof and an outer through hole formed in the outer bent element; the inner panel has an inner through hole formed at the upper part thereof so that the hole center is aligned with that of the outer through hole; and a fastener is inserted through the outer through hole and the inner through hole to fix the inner panel to the outer panel, whereby a top rail is formed.

The characteristic configuration of the invention of the ninth aspect is such that either one or both of the inner panel and the outer panel are formed of a synthetic resin, and a recess is formed in the inner panel between fastening portions where the top rail is fastened by the fastener.

In the truck platform construction described in the invention of the ninth aspect, when an external force acts on the platform from the rear side, stress is concentrated at the recess in the inner panel, so that the side panel is easily deformed in this portion.

DETAILED DESCRIPTION OF THE PREFERRED EMBODIMENTS

A first embodiment of the present invention will now be described with reference to the accompanying drawings.

Figure 1:
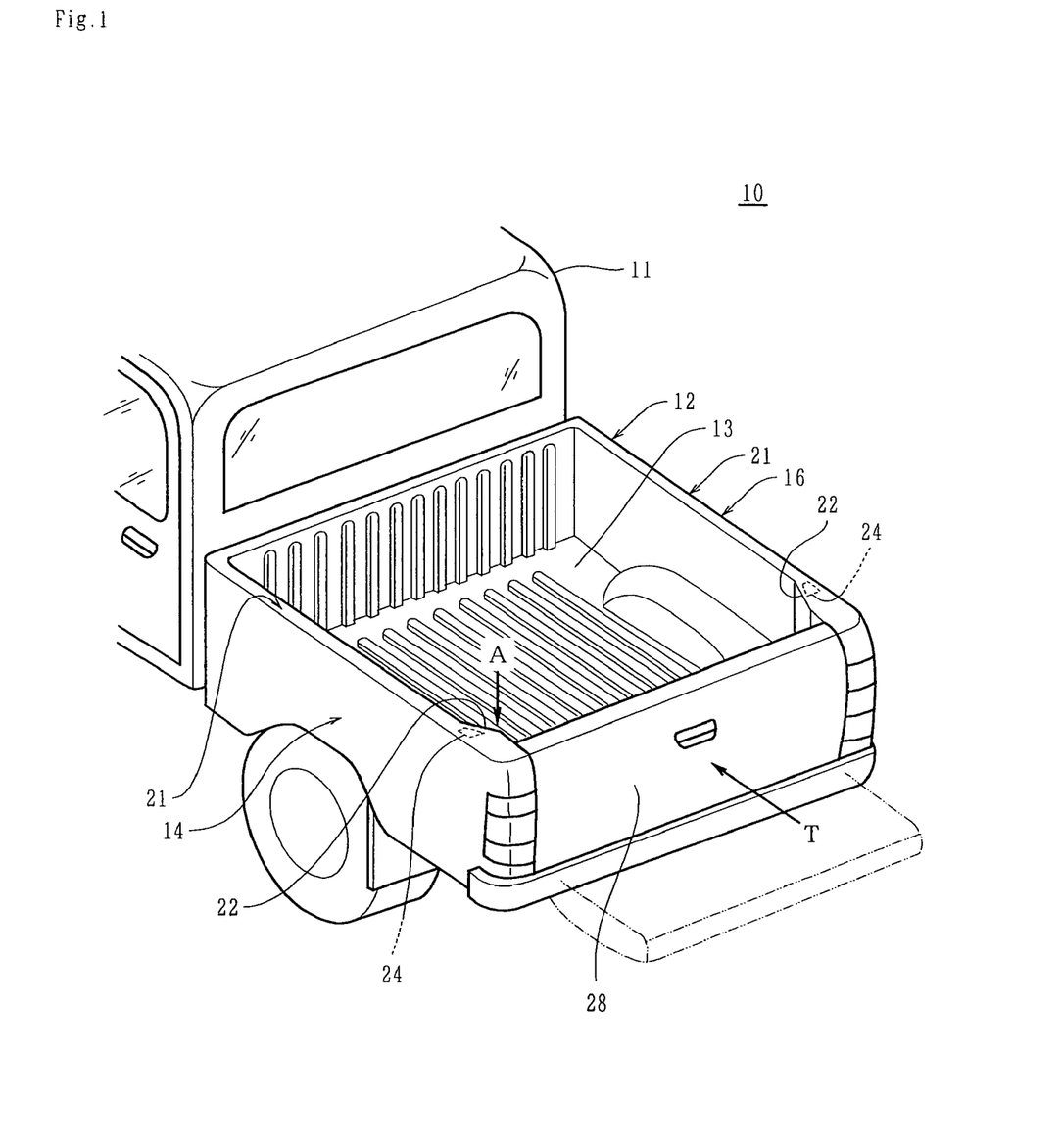
FIG. 1 is a perspective view of an essential portion of a truck of a first embodiment, viewed from the rear side.

As shown in FIG. 1, a platform 12 is provided on the back surface of a cab 11 of a truck 10. At both side edges of a floor panel 13 of the platform 12, a pair of side panels 14 and 16 are erected. Since the paired side panels 14 and 16 are symmetrical in the right-and-left direction, only the left side panel 14 is explained, and the explanation of the right panel 16 is omitted. The side panel 14 includes an outer panel 17 constituting a side external wall of the platform 12 and an inner panel 18 constituting a side internal wall of the platform 12 (FIGS. 3 and 5).

Figure 2:
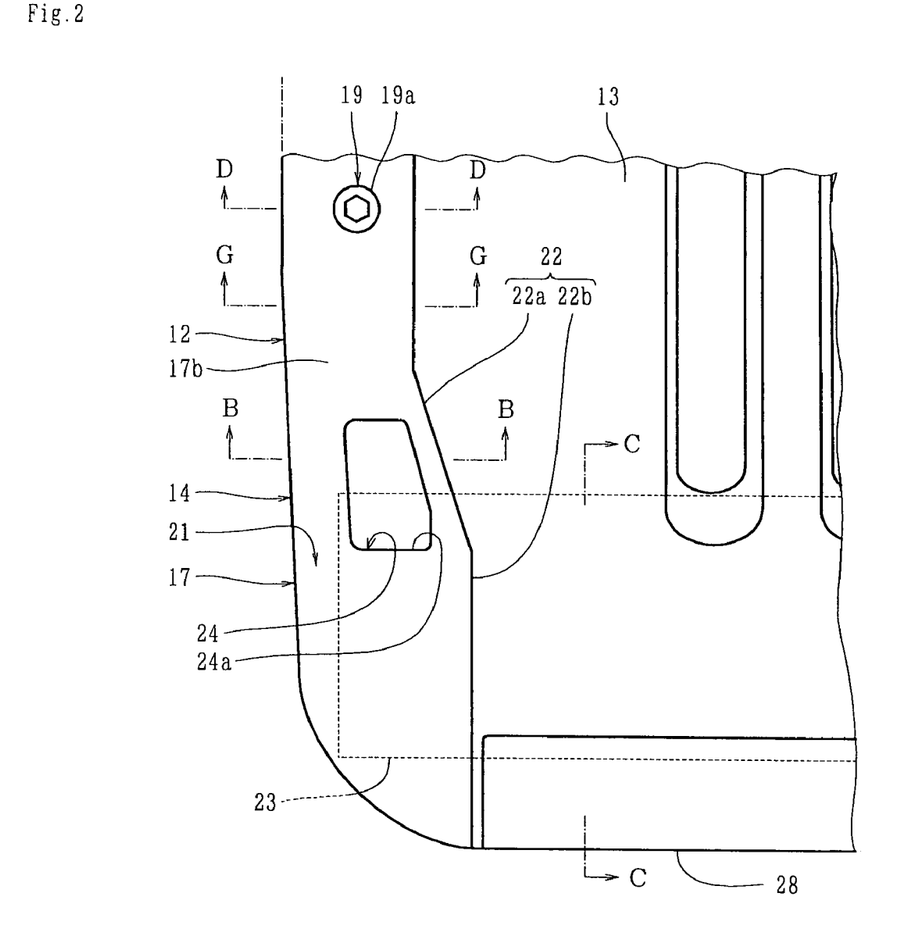
FIG. 2 is a view taken in the direction of arrow A of FIG. 1, showing a state in which a garnish is removed.

The outer panel 17, which is formed by bending a metal sheet such as a steel sheet or an aluminum alloy sheet, has an outer panel body 17a facing to the outside of the truck 10 and an outer bent element 17b which is formed at the upper edge of the outer panel body 17a and extends horizontally to the inside in the vehicle width direction. The inner panel 18, which is formed of a synthetic resin such as FRP (fiber-reinforced plastic), has an inner panel body 18a facing to the inside of the truck 10 and an inner bent element 18b which is formed at the upper edge of the inner panel body 18a and extends horizontally to the outside in the vehicle width direction. In the case of this embodiment, a top rail 21 is formed by fixing the outer bent element 17b and the inner bent element 18b, which is an upper part of the inner panel 18, to each other with fasteners 19 in a state in which the element 17a is lapped on the element 18a so that the outer bent element 17a is positioned over the inner bent element 18b (FIGS. 2 and 5). As the aforementioned fastener 19, a bolt 19a and a nut 19b are used. The outer bent element 17b is formed with outer through holes 17c through which the bolts 19a are inserted, and the inner bent element 18b is formed with inner through holes 18c which are opposed to the outer through holes 17c and through which the bolts 19a are inserted (FIG. 5). The fastener may be a rivet, not the bolt and nut.

Figure 3:
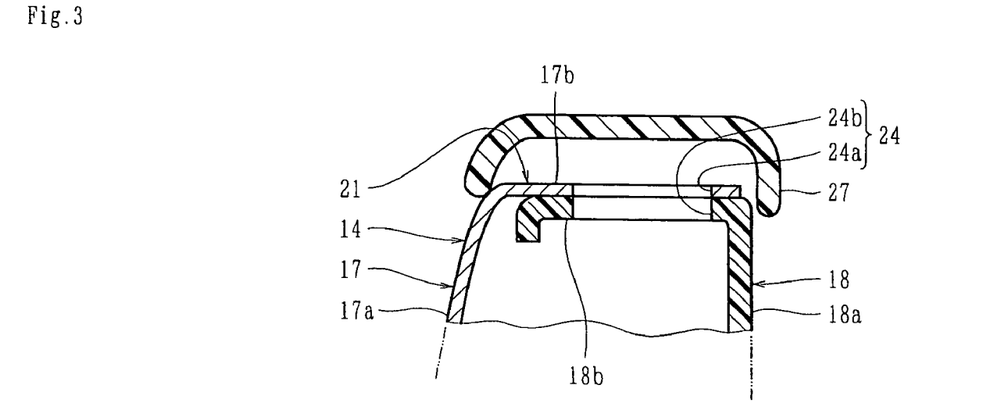
FIG. 3 is a sectional view taken along the line B-B of FIG. 2.
Figure 4:
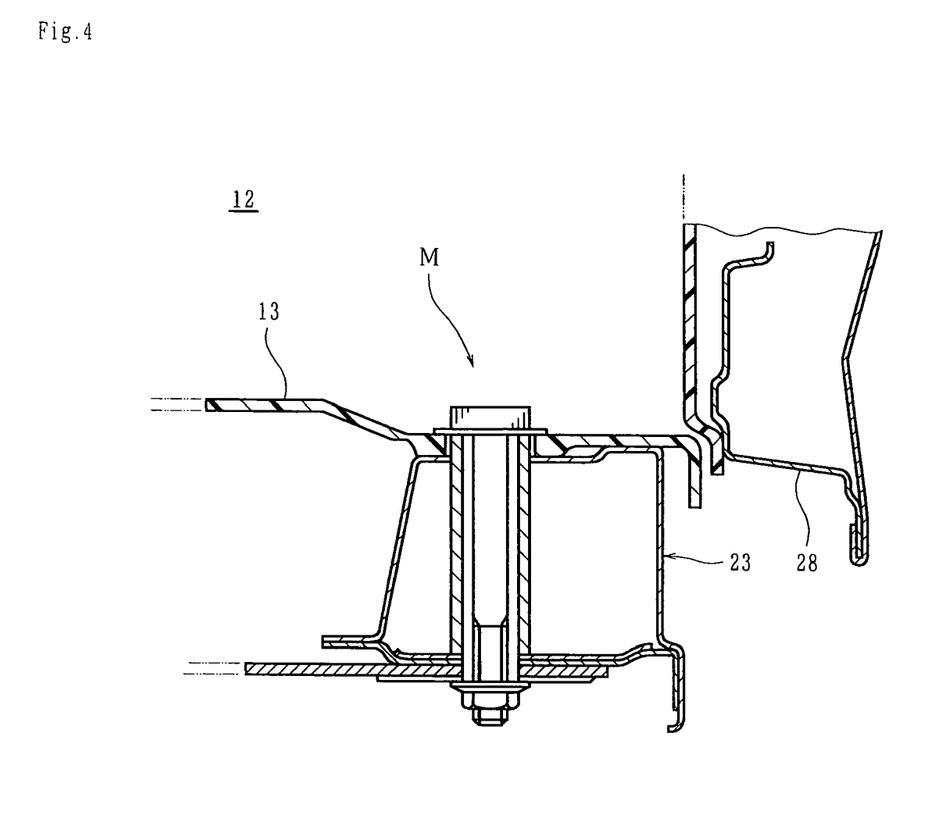
FIG. 4 is a sectional view taken along the line C-C of FIG. 2.

At the rear part of the top rail 21, a width change portion 22 in which the width of the top rail 21 changes in a plan view is formed (FIGS. 1 to 3). As shown in FIG. 2 in detail, the width change portion 22 has a trapezoidal portion 22a which is configured so that the width of the top rail 21 increases gradually to the inside in the vehicle width direction toward the rear of the truck and a rectangular portion 22b which is connected to the rear end of the trapezoidal portion 22a and extends with the width at the rear end of the trapezoidal portion 22a. On the rear lower surface of the platform 12, that is, on the rear lower surface of the floor panel 13, a rear reinforcing member 23 constituting a mount portion M (FIG. 4) of the platform 12 is provided so as to extend in the vehicle width direction (FIGS. 2 and 4). The front part of the width change portion 22 is provided at a position at which it does not overlap with the rear reinforcing member 23 in a plan view (FIG. 2). In this embodiment, the width change portion 22 is configured so that the front part thereof is positioned in front of the rear reinforcing member 23 and the rear part thereof overlaps with the rear reinforcing member 23 in a plan view.

Figure 5:
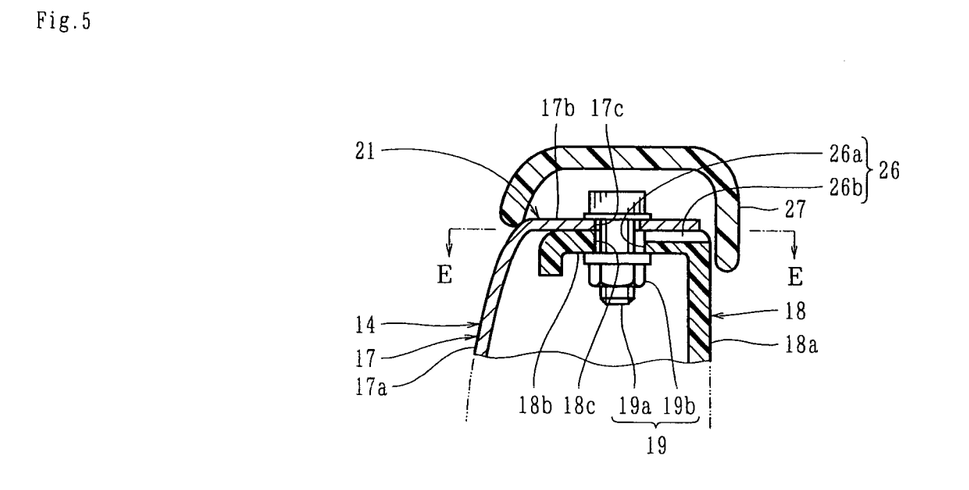
FIG. 5 is a sectional view taken along the line D-D of FIG. 2.
Figure 6:
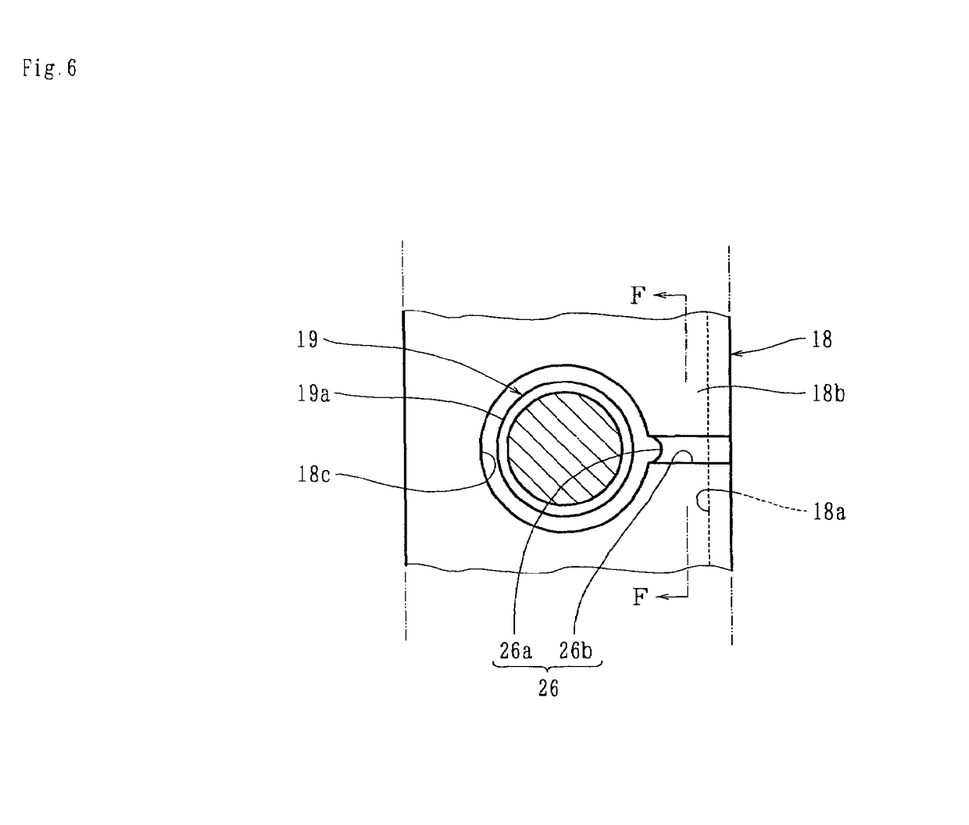
FIG. 6 is a sectional view taken along the line E-E of FIG. 5.
Figure 7:
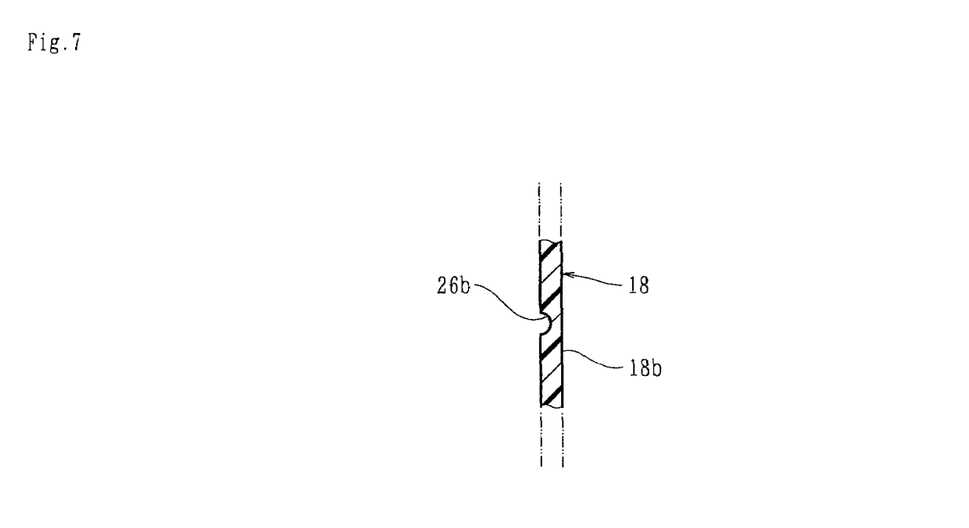
FIG. 7 is a sectional view taken along the line F-F of FIG. 6.

A weak portion 24 for change portion is formed in the width change portion 22 (FIGS. 2 and 3), and a weak portion 26 for through hole is formed at the peripheral edge of the inner through hole 18c in the inner panel 18 (FIGS. 5 to 7). In this embodiment, the weak portion 24 for change portion consists of a rectangular outer opening 24a formed in the outer bent element 17b of the width change portion 22 and an inner opening 24b formed into the same shape as that of the outer opening 24a at a position opposed to the outer opening 24a (FIGS. 2 and 3). The outer opening 24a and the inner opening 24b are configured so that the front parts thereof are positioned in front of the rear reinforcing member 23 in a plan view, and the rear parts thereof overlap with the rear reinforcing member 23 in a plan view (FIG. 2). Also, in this embodiment, the weak portion 26 for through hole consists of a single notch 26a formed at the peripheral edge of the inner through hole 18c and a groove 26b one end of which is connected to the notch 26a and the other end of which extends to the inside in the vehicle width direction (FIGS. 6 and 7).

Figure 8:
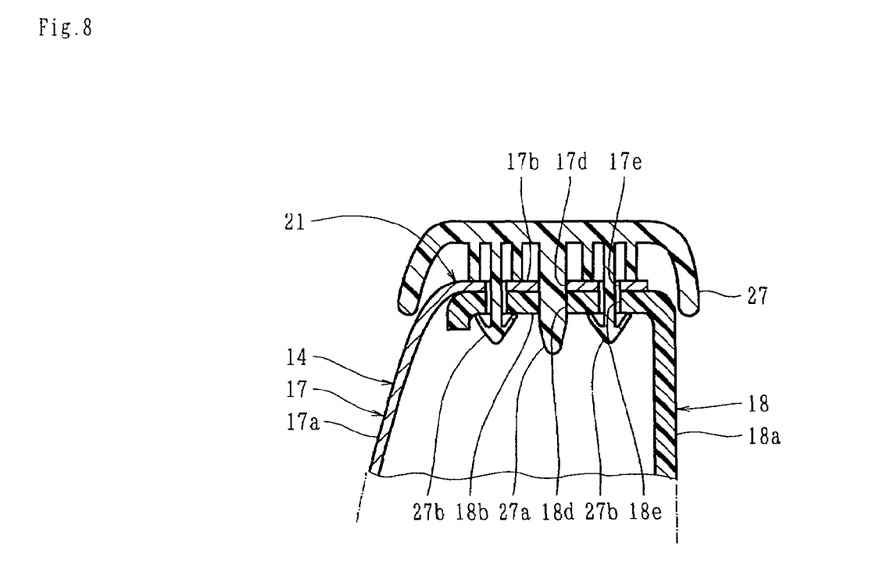
FIG. 8 is a sectional view taken along the line G-G of FIG. 2.

The top surface of the top rail 21 is covered with a garnish 27 formed of a synthetic resin such as polypropylene (PP) (FIGS. 3, 5 and 8). On the lower surface of the garnish 27, a positioning pin 27a and locking members 27b are projectingly provided (FIG. 8). The positioning pin 27a is inserted through positioning holes 17d and 18d formed in the outer bent element 17b and the inner bent element 18b, and the locking elements 27b are locked to engagement holes 17e and 18e formed in the outer bent element 17b and the inner bent element 18b.

In the truck platform construction configured as described above, when an external force T (FIG. 1) acts on the platform 12 from the rear side, the external force is applied from a tail gate 28 to the side panel 14 via a locking member etc. (not shown). The top rail 21 of the side panel 14 has high rigidity, and further forms a portion with higher rigidity because the outer panel 17 and the inner panel 18 are fixed to each other at the upper part of the side panel 14 to form a closed cross-sectional shape. The width change portion 22, which is a portion in which the rigidity changes, is provided on the top rail 21 with high rigidity, and stress is concentrated at this portion to produce deformation, by which energy can be absorbed. If the outer opening 24a or the inner opening 24b is provided in the width change portion 22, stress is further concentrated at this portion, and if the notch 26a or the groove 26b is provided, stress is further concentrated at this portion. Therefore, the side panel 14 is deformed due to the outer opening 24a or the inner opening 24b.

Also, a crack is generated in the inner bent element 18b from the notch 26a through the groove 26b, and thus the inner through hole 18c is increased, so that the nut 19b comes off the inner through hole 18c. Thereby, the closed cross-sectional shape formed by the outer panel 17 and the inner panel 18 is collapsed, so that the side panel 14 becomes easy to deform. Further, if the width change portion 22 is configured so that the front part thereof is positioned in front of the rear reinforcing member 23 and the rear part thereof overlaps with the rear reinforcing member 23 in a plan view, the rigidity of the platform 12 can be changed greatly in this portion, so that deformation due to stress concentration is produced, and hence energy can be absorbed. As a result, the energy of the aforementioned external force T can surely be absorbed by the deformation of the platform 12, so that the external force transmitted to the cab 11 decreases, by which the deformation of the cab 11 can be prevented.

Since the top surface of the top rail 21 is covered with the garnish 27, the heads of the bolts 19a and the outer opening 24a are invisible. Therefore, the appearance of the platform 12 can be improved, and the top rail 21 can be prevented from being damaged by a cargo.

Figure 9:
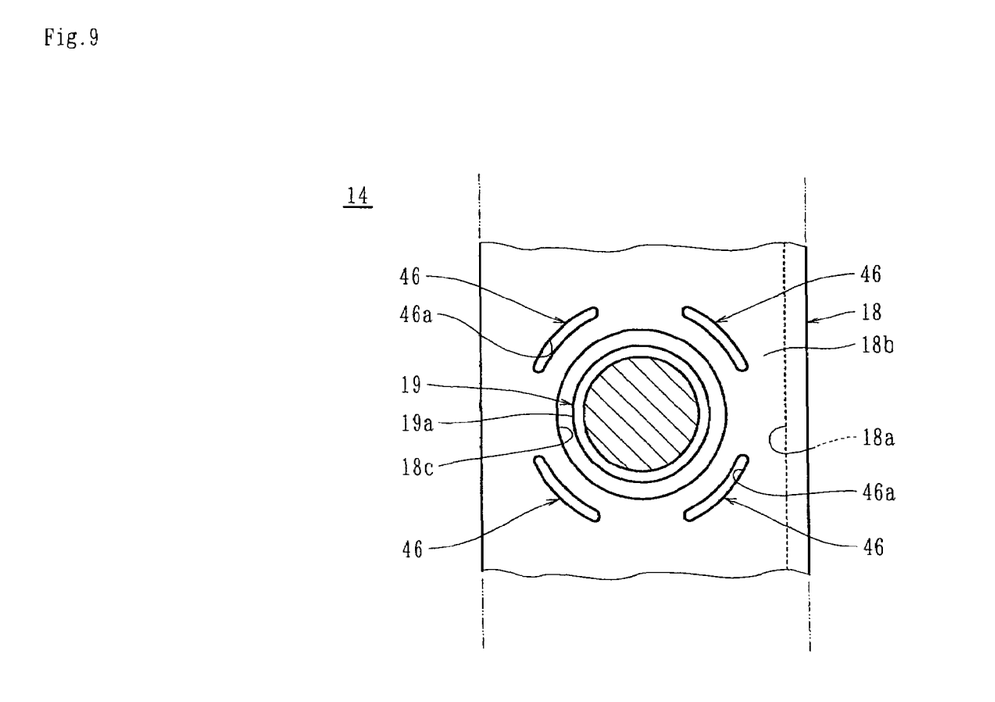
FIG. 9 is a sectional view showing a second embodiment of the present invention, which corresponds to FIG. 6.

FIG. 9 shows a second embodiment of the present invention. In FIG. 9, the same reference numerals are applied to the same elements as those shown in FIG. 6.

In this embodiment, a weak portion 46 for through hole formed at the peripheral edge of the inner through hole 18c in the inner panel 18 consists of a plurality of slits 46a (elongated holes) formed on the outside of the peripheral edge of the inner through hole 18c. Each of these slits 46a is formed on the same circumference around the inner through hole 18c into an arcuate shape with a predetermined interval being provided in the circumferential direction. Other constructions are the same as those of the first embodiment.

In the truck platform construction configured as described above, when an external force acts on the platform from the rear side, stress is concentrated between the slits 46a. Therefore, a crack is generated between the slits 46a in the inner bent element 18b, and thus the nut comes off the inner bent element 18b together with a part of the inner bent element 18b in the slit 46a. Thereby, the closed cross-sectional shape formed by the outer panel 17 and the inner panel 18 is collapsed, so that the side panel 14 becomes easy to deform. As a result, the energy of the aforementioned external force T can surely be absorbed by the deformation of the platform 12, so that the external force transmitted to the cab 11 decreases, by which the deformation of the cab 11 can be prevented.

FIGS. 10 to 13 show a third embodiment of the present invention. In FIGS. 10 to 13, the same reference numerals are applied to the same elements as those shown in FIGS. 1, 2 and 5.

Figure 12:
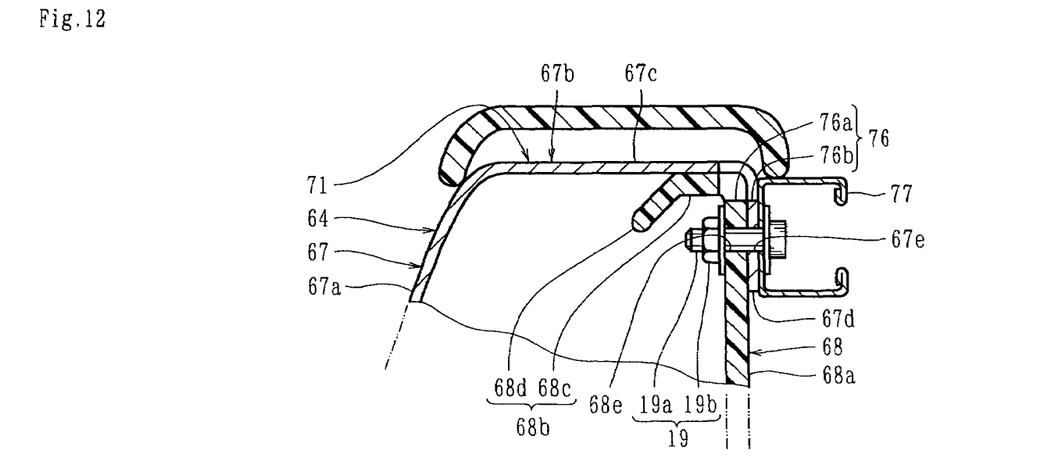
FIG. 12 is a sectional view taken along the line I-I of FIG. 11.
Figure 13:
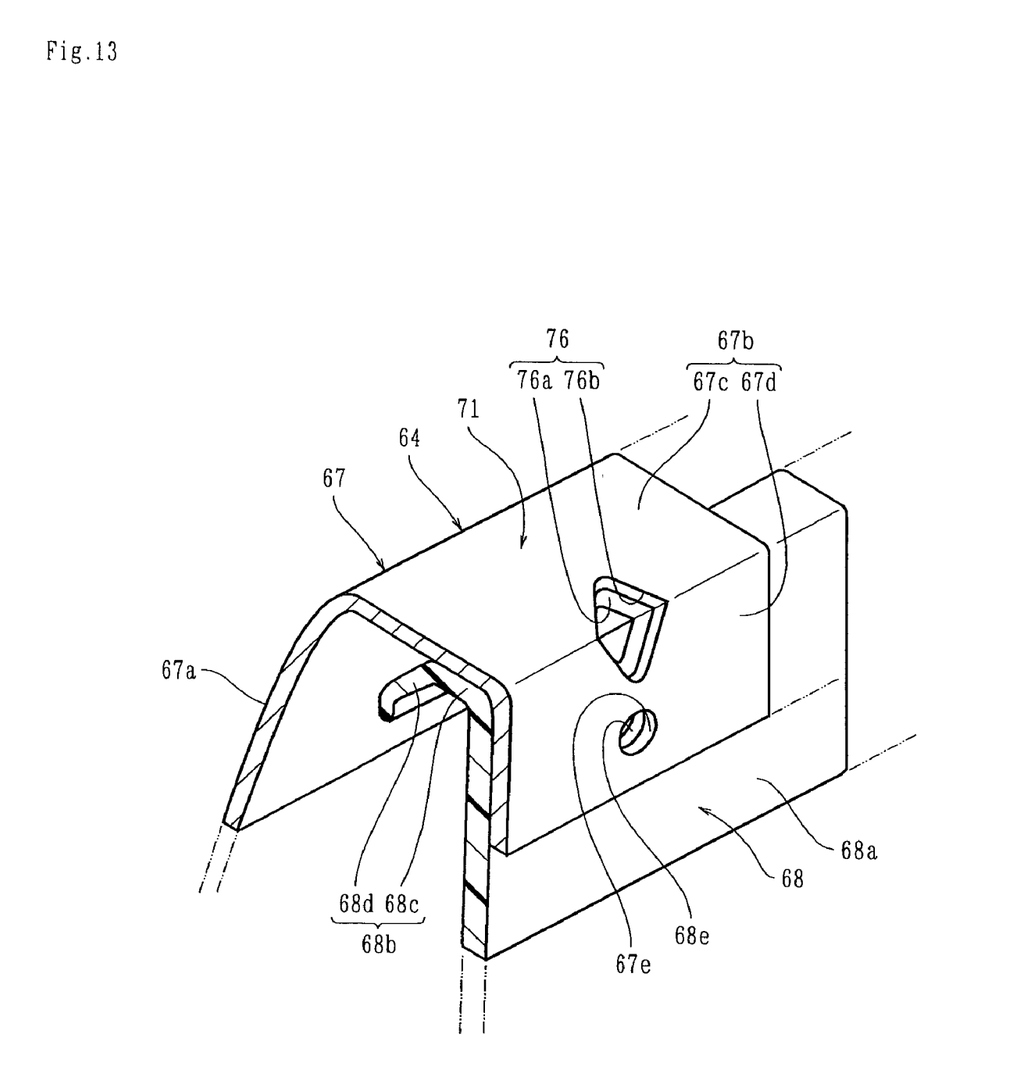
FIG. 13 is a perspective view of an essential portion of a side panel in a state in which a side rail and a garnish are removed.

In this embodiment, a metallic outer panel 67 of a side panel 64 has an outer panel body 67a facing to the outside of a truck 60 and an outer bent element 67b formed at the upper edge of the outer panel body 67a, and a synthetic resin made inner panel 68 of the side panel 64 has an inner panel body 68a facing to the inside of the truck 60 and an inner bent element 68b formed at the upper edge of the inner panel body 68a (FIGS. 12 and 13). The outer bent element 67b consists of an outer horizontal portion 67c which extends horizontally to the inside in the vehicle width direction from the upper edge of the outer panel body 67a and a depending portion 67d which is connected to the tip-end edge of the horizontal portion 67c and extends downward. The inner bent element 68b consists of an inner horizontal portion 68c which extends horizontally to the outside in the vehicle width direction from the upper edge of the inner panel body 68a and an inclined portion 68d which extends downward slantwise from the tip-end edge of the inner horizontal portion 68c. Reference numeral 66 in FIG. 10 denotes a side panel provided on the right-hand side of a platform 62.

The depending portion 67d of the outer bent element 67b is formed with an outer through holes 67e through which the bolts 19a of the fasteners 19 are inserted, and at the upper part of the inner panel body 68a, an inner through holes 68e is formed so that the hole center is aligned with that of the outer through hole 67e. Specifically, the bolt 19a is inserted through the outer through hole 67e and the inner through hole 68e, and the nut 19b is threadedly engaged with the projecting end portion of the bolt 19a to fix the outer panel 67 and the inner panel 68 to each other, by which a top rail 71 is formed (FIG. 12). In this case, a gap may be formed between the outer horizontal portion 67c and the inner horizontal portion 68c, and also the inner bent element 68b is not necessarily needed.

A weak portion 76 for through hole is formed at the peripheral edge of the inner through hole 68e and the outer through hole 67e (FIGS. 12 and 13). In this embodiment, the weak portion 76 for through hole consists of an inner notch 76a formed in a connection portion of the inner panel body 68a and the inner horizontal portion 68c at the peripheral edge of the inner through hole 68e and an outer notch 76b formed in a connection portion of the outer horizontal portion 67c and the depending portion 67d at the peripheral edge of the outer through hole 67e so as to be opposed to the inner notch 76a.

Figure 10:
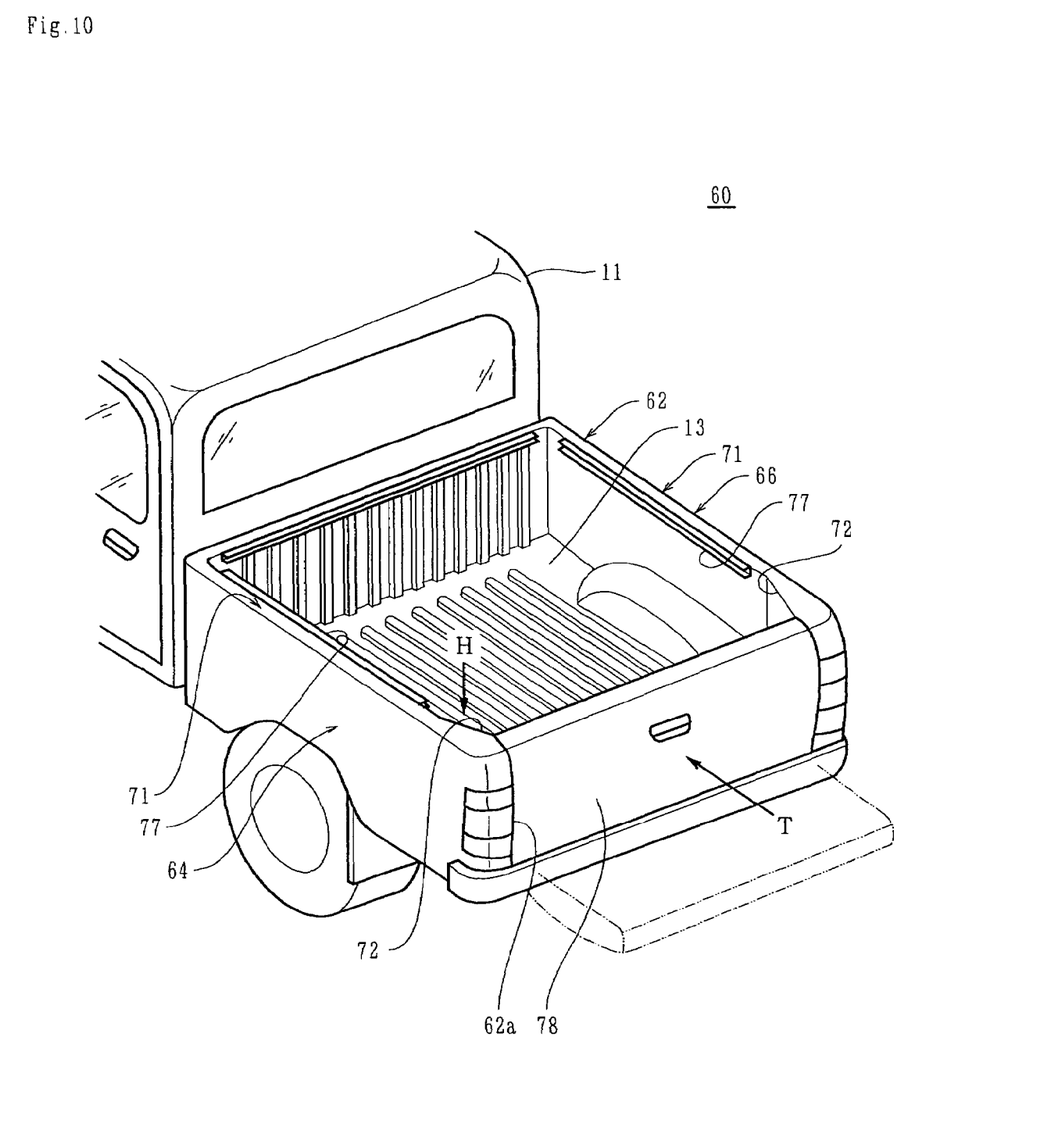
FIG. 10 is a perspective view of an essential portion showing a third embodiment of the present invention, which corresponds to FIG. 1.
Figure 11:
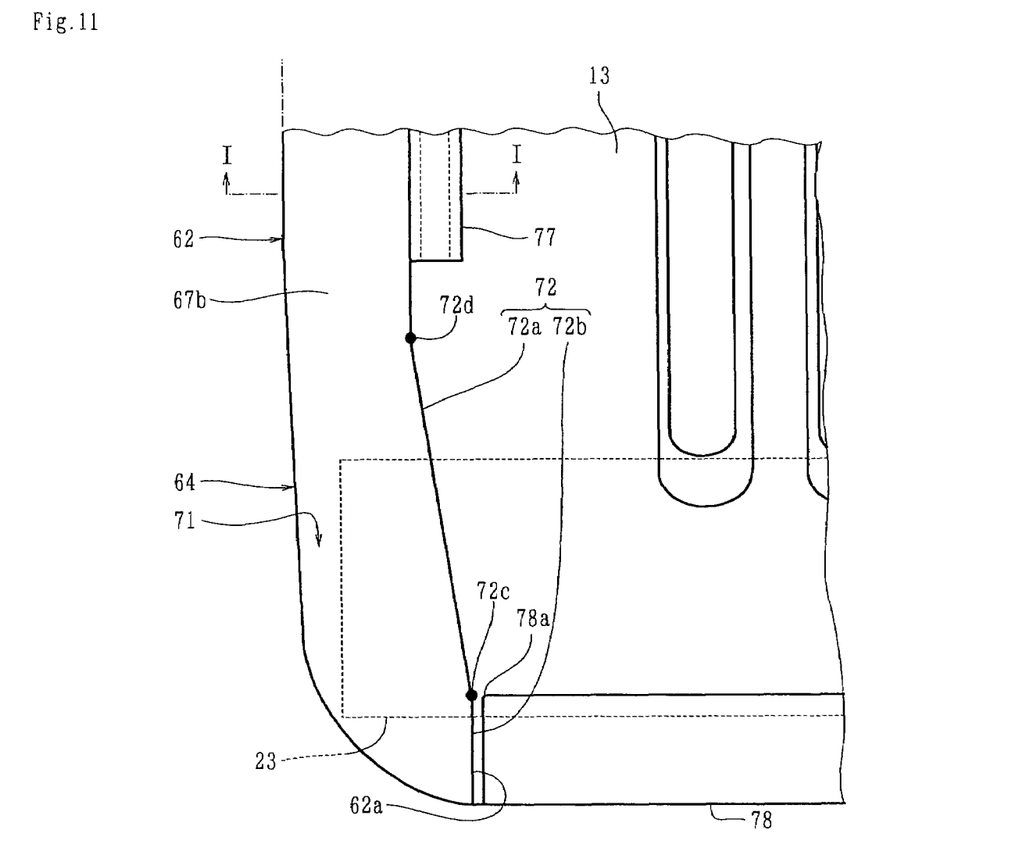
FIG. 11 is a view taken in the direction of arrow H of FIG. 10.

On the upper internal surface of the side panel 64, that is, on the internal surface of the top rail 71, a side rail 77 having a channel shape in cross section, which extends in the travel direction of the truck 60, is attached by using the bolts 19a and the nuts 19b (FIGS. 10 to 12). The side rail 77 is provided so that the rear end thereof is positioned at a predetermined distance in front of a width change portion 72 (FIG. 11). Further, an opening 62a is provided at the rear end of the side panel 64 of the platform 62, and a tail gate 78 for openably closing the opening 62a is provided in the opening 62a so as to extend in the vehicle width direction (FIGS. 10 and 11). In a state in which the opening 62a is closed by the tail gate 78, the inside edge of the width change portion 72 is gently connected to the side edge of the tail gate 78. Specifically, the configuration is such that the rear end of a trapezoidal portion 72a of the width change portion 72 coincides approximately with a side front end 78a of the tail gate 78, and the length of a rectangular portion 72b coincides approximately with the thickness of the tail gate 78. In other words, a terminal end 72c of spread of the width change portion 72 coincides with the side front end 78a of the tail gate 78 in a state of being closed and a base end 72d of the width change portion 72 is connected linearly to the terminal end 72c of the width change portion 72 (FIG. 11). Thereby, the appearance of the rear end corner portion of the platform 62 can be improved, and cargoes can easily be put in or taken out through the opening 62a of the platform 62. Further, since the platform width at the rear part of the platform 62 is great (the platform shown in FIG. 11 is wider than the platform shown in FIG. 2), a large storage space can be secured. Other constructions are the same as those of the first embodiment.

In the truck platform construction configured as described above, when an external force T (FIG. 10) acts on the platform 62 from the rear side, stress is concentrated between the front end of the width change portion 72 and the rear end of the side rail 77, and also stress is concentrated at the inner notch 76a and the outer notch 76b. Therefore, the side panel 64 is deformed between the front end of the width change portion 72 and the rear end of the side rail 77, and also deformation is produced at the inner notch 76a or the outer notch 76b. As a result, the energy of the aforementioned external force T can surely be absorbed by the deformation of the platform 62, so that the external force transmitted to the cab 11 decreases, by which the deformation of the cab 11 can be prevented.

Figure 14:
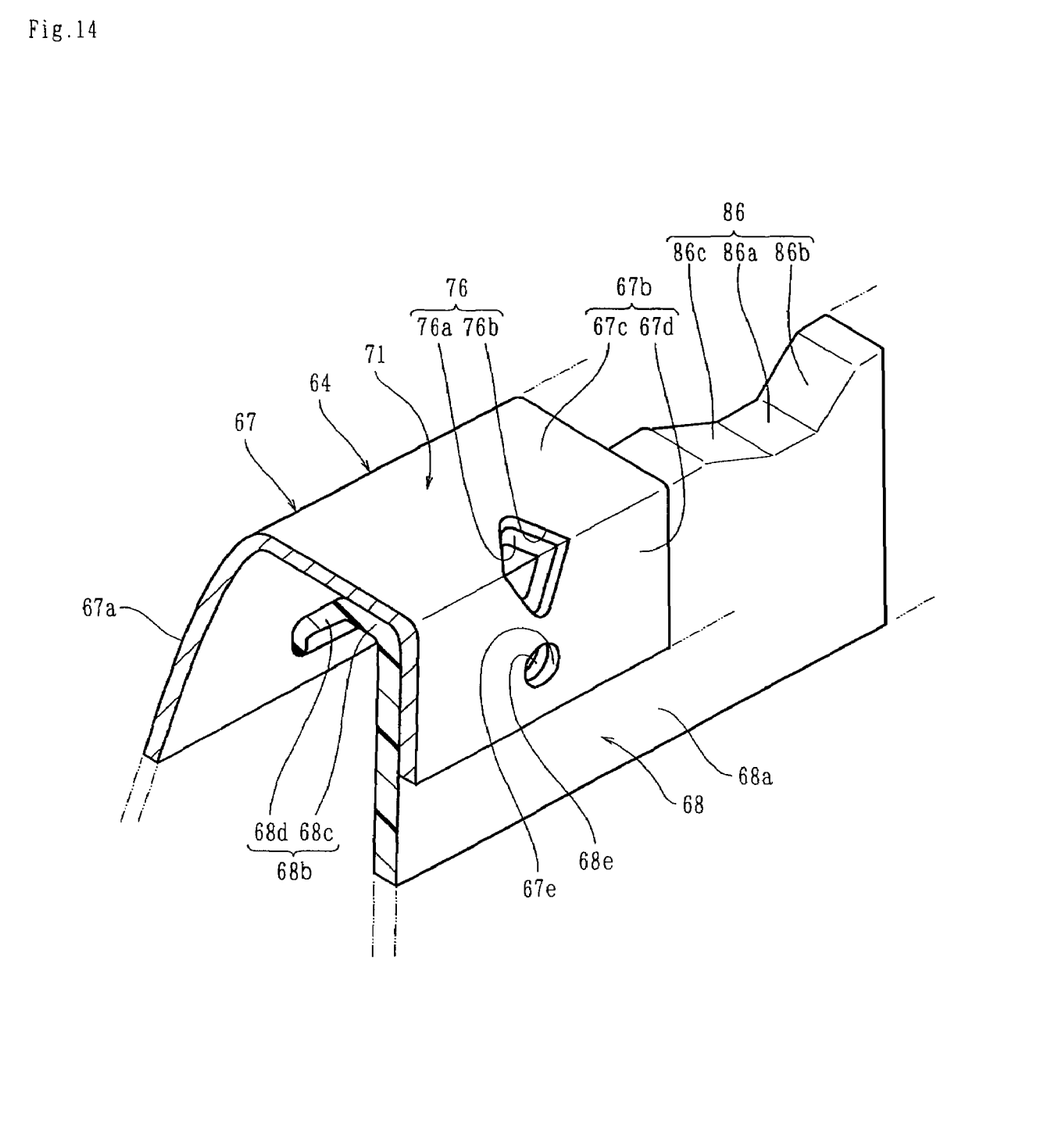
FIG. 14 is a perspective view of an essential portion showing a fourth embodiment of the present invention, which corresponds to FIG. 13.

FIG. 14 shows a fourth embodiment of the present invention. In FIG. 14, the same reference numerals are applied to the same elements as those shown in FIG. 13.

In this embodiment, the outer panel 67 is formed of a metal sheet, the inner panel 68 is formed by a synthetic resin, and a recess 86 is formed in the inner panel 68 between fastening portions where the top rail 71 is fastened by the fastener. The bolt of the fastener is inserted through the inner through hole 68e formed at the upper part of the inner panel body 68a and the outer through hole 67e formed in the depending portion 67d of the outer bent element 67b. These through holes 68e and 67e are formed in plural number in the truck travel direction with predetermined intervals being provided. Also, the recess 86 is formed between the inner through hole 68e and the outer through hole 67e and the through holes 68e and 67e adjacent to these through holes 68e and 67e. This recess 86 has a horizontal portion 86a which is formed a predetermined distance lower than the inner horizontal portion 68c, a front connecting portion 86b the rear end of which is connected to the front end of the horizontal portion 86a, the height of which is gradually increased toward the front of truck, and the front end of which is connected to the inner horizontal portion 68c, and a rear connecting portion 86c the front end of which is connected to the rear end of the horizontal portion 86a, the height of which is gradually increased toward the rear of truck, and the rear end of which is connected to the inner horizontal portion 68c. Other constructions are the same as those of the third embodiment.

In the truck platform construction configured as described above, when an external force acts on the platform 62 from the rear side, stress is concentrated at the recess 86, so that this portion is deformed. As a result, the energy due to the aforementioned external force can surely be absorbed by the deformation of platform, so that the external force transmitted to the cab 11 decreases, by which the deformation of the cab 11 can be prevented. Also, if the recess 86 is combined with the width change portion 22 and the weak portion 24 for change portion (the outer opening 24a, the inner opening 24b) shown in FIGS. 2 and 3, the weak portion 26 for through hole (the notch 26a, the groove 26b) shown in FIG. 6, the weak portion 46 for through hole (the slit 46a) shown in FIG. 9, or a weak portion 76 for through hole (the inner notch 76a, the outer notch 76b) shown in FIGS. 13 and 14, the deformation of cab 11 can be prevented more effectively.

Although the recess 86 is provided in the inner horizontal portion 68c in the fourth embodiment, the recess may be provided in the inner bent element 18b (FIG. 5) in the first embodiment. Furthermore, this recess may be combined with the width change portion and the weak portion for change portion (outer opening, inner opening) of the top rail or the weak portion for through hole (notch, groove, slit, notch).

As described above, according to the present invention, the configuration is such that the width change portion in which the width of top rail changes is formed at the rear part of the top rail, and the width of the width change portion increases gradually toward the rear of the truck. Therefore, when an external force acts on the platform from the rear side, stress is concentrated in the front portion of the width change portion, and thus the side panel is deformed in this portion. As a result, the energy of the aforementioned external force can surely be absorbed by the deformation of the platform, so that the external force transmitted to the cab decreases, by which the deformation of the cab can be prevented.

Also, if the terminal end of spread of the width change portion is caused to coincide with the side edge of the tail gate in a state of being closed, the appearance of the rear end corner portion of platform can be improved, and cargoes can easily be put in or taken out through the opening at the rear end of the platform. Further, since the platform width at the rear part of the platform increases, a large storage space can be secured.

If the rear reinforcing member is provided on the rear end lower surface of the platform so as to extend in the vehicle width direction, and at least the front part of the width change portion is formed at a position at which it does not overlap with the rear reinforcing member in a plan view, the rigidity of the platform can be changed greatly at the front part of the width change portion, so that deformation due to stress concentration is produced at the front part of the width change portion, and hence energy can be absorbed.

If the weak portion for change portion is formed in the width change portion, stress is further concentrated at this portion, so that the side panel is deformed in the weak portion for change portion.

Also, either one or both of the inner panel and the outer panel are formed of a synthetic resin, and the weak portion for through hole is formed at the peripheral edge of either one or both of the inner through hole in the inner panel and the outer through hole in the outer panel. Thereby, when an external force acts on the platform from the rear side, stress is concentrated at the weak portion for through hole, and hence a crack is generated in this portion, so that the fastener comes off the inner panel, and the side panel becomes easy to deform. As a result, the energy of the aforementioned external force can surely be absorbed by the deformation of the platform, so that the external force transmitted to the cab decreases, by which the deformation of the cab can be prevented. Further, the inner panel or the outer panel formed of a synthetic resin has a relatively simple shape, so that the formability thereof can be improved.

If the side rail having a channel shape in transverse cross section, which extends in the travel direction of the truck and the rear end of which is positioned in front of the width change portion, is attached on the upper inside surface of the side panel, when an external force acts on the platform from the rear side, stress is concentrated between the front end of the width change portion and the rear end of the side rail, so that deformation occurs between the front end of the width change portion and the rear end of the side rail. As a result, as described above, the energy of the aforementioned external force can surely be absorbed by the deformation of the platform, so that the external force transmitted to the cab decreases, by which the deformation of the cab can be prevented.

Further, if either one or both of the inner panel and the outer panel are formed of a synthetic resin, and the recess is formed in the inner panel between fastening portions where the top rail is fastened by the fastener, when an external force acts on the platform from the rear side, stress is concentrated at the recess in the inner panel, so that the side panel is easily deformed in this portion. As a result, the energy of the aforementioned external force can surely be absorbed by the deformation of the platform, so that the external force transmitted to the cab decreases, by which the deformation of the cab can be prevented.

What is claimed is:

1. A truck platform construction in which a side panel erected at both side edges of a platform on a back surface of a cab has an outer panel which constitutes a side external wall of said platform and an inner panel which constitutes a side internal wall of said platform;
   said outer panel has an outer bent element formed at an upper edge thereof and an outer through hole formed in said outer bent element;
   said inner panel has an inner through hole formed at the upper part thereof so that a center of the inner through hole is aligned with a center of said outer through hole; and
   a fastener is inserted through said outer through hole and said inner through hole to fix said inner panel to said outer panel, whereby a top rail is formed, wherein
   either one or both of said inner panel and said outer panel are formed of a synthetic resin; and
   a weak portion for through hole is formed at a peripheral edge of either one or both of said inner through hole in the inner panel and said outer through hole in the outer panel.

2. The truck platform construction according to claim 1, wherein said weak portion for through hole is one kind or two or more kinds selected from a group consisting of a notch, a groove, a slit, and a notch formed at the peripheral edge of either one or both of said outer through hole and said inner through hole.

3. The truck platform construction according to claim 1, wherein said weak portion for through hole consists of either one or both of an inner notch formed in a bent portion of said inner panel at the peripheral edge of said inner through hole and an outer notch formed in a bent portion of said outer panel at the peripheral edge of said outer through hole so as to be opposed to said inner notch.

4. The truck platform construction according to claim 1, wherein a side rail having a channel shape in transverse cross section, which extends in a travel direction of a truck and a rear end of which is positioned in front of a width change portion, is attached on an upper inside surface of said side panel.

* * * * *